United States Patent [19]

Crawford

[11] Patent Number: 5,027,466
[45] Date of Patent: Jul. 2, 1991

[54] PORTABLE RECEIVER FOR PIPELINE PIGS

[76] Inventor: Marshall K. Crawford, Houston, Tex.

[21] Appl. No.: 458,319

[22] Filed: Dec. 28, 1989

[51] Int. Cl.⁵ ............................................. B08B 13/00
[52] U.S. Cl. ............................................. 15/104.062
[58] Field of Search ............ 15/104 R, 104.03.104.04, 15/104.05, 104.061, 104.062; 137/268; 294/77; 383/117; 406/171; 55/341.2, 378, 505; 138/96 R, 89; 206/77.1; 4/654, 292, 656

[56] References Cited

U.S. PATENT DOCUMENTS

| | | | |
|---|---|---|---|
| 1,046,758 | 12/1912 | Fisher | 362/179 |
| 1,220,234 | 3/1917 | Kaufman | 362/179 |
| 1,290,405 | 1/1919 | Suter | 141/248 |
| 1,300,248 | 4/1919 | Coleman | 422/266 |
| 1,339,498 | 5/1920 | Connable | 55/505 |
| 1,964,939 | 7/1934 | Engh et al. | 362/179 |
| 2,544,190 | 3/1951 | Todd | 55/505 |
| 3,745,328 | 7/1973 | Hissen et al. | 362/179 |
| 3,904,393 | 9/1975 | Morse | 55/505 |
| 4,126,986 | 11/1978 | Kidd | 56/16.6 |
| 4,694,892 | 9/1987 | Borchert | 15/104.062 |
| 4,736,482 | 4/1988 | Lankston | 15/104.62 |

FOREIGN PATENT DOCUMENTS

| | | | |
|---|---|---|---|
| 3211622 | 10/1983 | Fed. Rep. of Germany | 15/104.062 |
| 1410194 | 10/1975 | United Kingdom | 15/104.62 |

Primary Examiner—Henry J. Recla
Assistant Examiner—Glenn T. Barrett
Attorney, Agent, or Firm—William E. Shull; Gregory L. Maag; David A. Rose

[57] ABSTRACT

Disclosed is a pig receiver for capturing a pipeline pig as it is discharged or ejected from the pipeline. The receiver is readily attachable, detachable and portable. The receiver includes a webbed conduit made of flexible webbing. The webbed conduit includes a passageway having a diameter approximately equal to the diameter of the pipeline to which it is attached. The webbed conduit includes longitudinally extending webbings having loops formed in the webbing ends. The receiver is attached to the pipeline flange by a chain disposed through the webbing loops and is secured around the pipeline by a padlock or other fastener. The unattached ends of the longitudinal webbings are drawn together and secured by a closure, preferably a clevis which is disposed through the loops in the unattached ends of the longitudinal webbings.

31 Claims, 3 Drawing Sheets

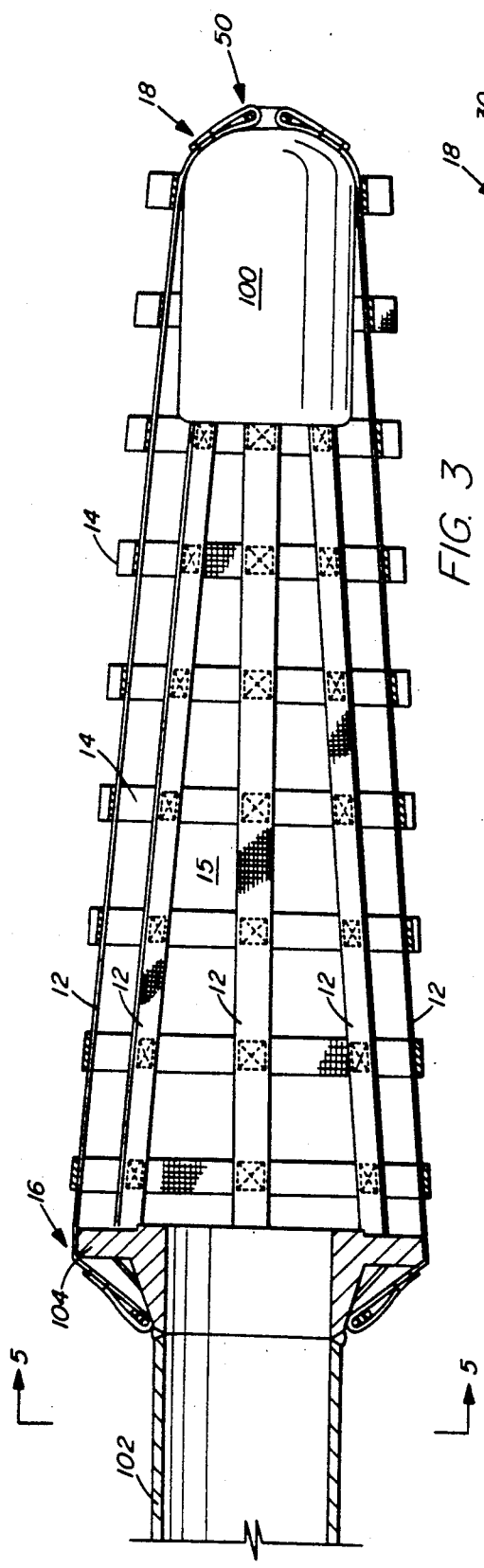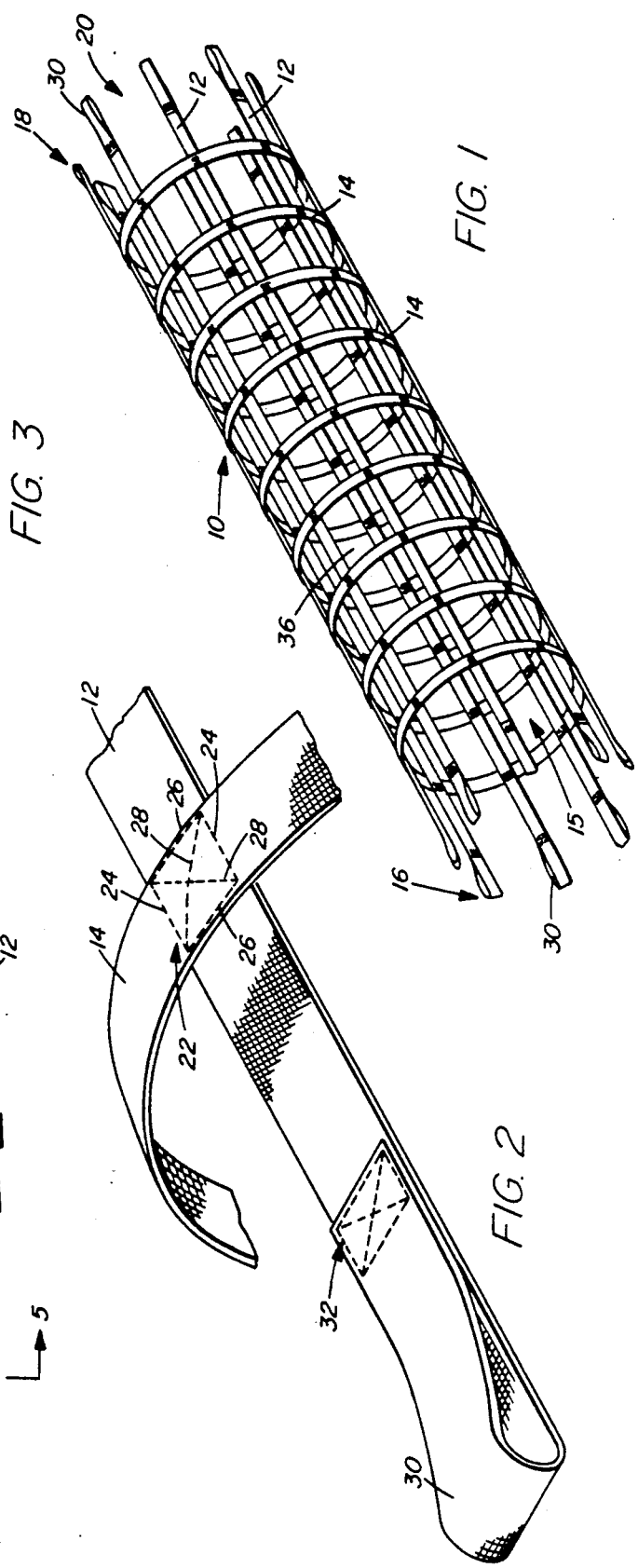

PORTABLE RECEIVER FOR PIPELINE PIGS

FIELD OF THE INVENTION

The present invention relates to apparatus useful in cleaning pipelines, such apparatus commonly known as pipeline pigs. More particularly, the invention relates to apparatus used to receive or catch a pipeline pig at the end of a pipeline. Still more particularly, the invention relates to a portable sling-like receiver for catching a pig as it is discharged from an end of the pipeline.

BACKGROUND OF THE INVENTION

Pipelines carrying crude oil or other petroleum products typically require periodic cleaning since certain additives, contaminants and other materials within the transported fluids tend to settle and deposit within the pipeline. If these deposits are not removed, they may eventually restrict the flow through the pipeline, or may contaminate other products which are subsequently transported through the pipeline. It is, of course, impractical and uneconomical to dismantle a pipeline and clean the individual pipe sections. Instead, pipelines are typically cleaned by means of apparatus known as pipeline pigs.

In general, a pipeline pig is a device inserted into and forced through a pipeline, typically by means of fluid pressure. Pipeline pigs have been developed for a number of uses. For example, as mentioned above, pipeline pigs are employed to clean inside pipelines and remove sediment or debris. Pipeline pigs are also commonly used to segregate different fluids which may be simultaneously transported through a given pipeline.

Cleaning pigs are generally sized to fit tightly within the pipeline. Such pigs may include brushes disposed on the pig's outer surface which are designed to contact the inside surface of the pipeline and assist in dislodging undesirable sludge or deposits. Pipeline cleaning pigs generally have an outside diameter which is substantially the same as the inside diameter of the pipeline, although some pigs, such as those made of polyurethane foam, are compressible, such that their uncompressed diameter is greater than the inside diameter of the pipeline. In any such design, the tight fit of the pig facilitates proper cleaning of the pipeline.

When employed to clean a pipeline, the pigs are placed in service or "launched" by an apparatus generally known as a launcher. Similarly, a device known as a receiver or catcher is employed to recover the pig at the end of the pipeline section being cleaned. Pig receivers are generally permanently installed in the pipeline at some distance away from the launcher.

Present day pig receivers are not truly portable devices, but are permanently affixed at a particular location within a pipeline. Once installed, such receivers cannot readily be detached from the pipeline and used in another pipeline, or even repositioned for use at another location in the same pipeline.

Although entire pipelines may at times require cleaning, it is not uncommon for pipelines to develop restrictions or undesirable deposits only in particular lengths or segments. To save the time and expense of launching a pipeline pig and running it through the entire length of the pipeline, it is often desirable to clean only the restricted or deposit-ladened sections of the pipeline. Frequently, such restricted segments may be located a great distance away from the nearest installed receiver. In such instances, to expedite the cleaning process, it is common to disconnect and isolate the section of pipeline that contains the unwanted sediment or restriction from the rest of the pipeline and to launch the pig through the now-isolated pipeline section. These sections are frequently cleaned without employing a pig receiver on the now-opened end of the isolated pipeline section.

As stated above, cleaning pigs are typically forced through the pipeline by means of fluid that is injected behind the pig at high pressures. The force acting on the pig and propelling it through the pipeline may be many thousands of pounds. For example, with a 30" diameter pipeline and a fluid pressure of 100 psi, the force on the 30" diameter pig will exceed 70,000 pounds. With forces of this magnitude propelling the pig through the pipeline, where a pig catcher is not employed, the pig will be discharged from the end of the pipeline segment at an extreme velocity. Such uncontrolled high velocity ejection of the cleaning pig can pose a grave danger to personnel and equipment.

Accordingly, there remains a need in the art for an apparatus for safely capturing pipeline pigs when they are discharged from a pipeline at locations where a permanent receiver has not been installed. Ideally, such apparatus would be portable and reusable at different locations along the pipeline as pipeline sections are selectively cleaned. The apparatus should also be inexpensive and simple to attach and detach.

SUMMARY OF THE INVENTION

Accordingly, there is provided a receiver for pipeline pigs structured to be portable and easy to attach and detach. The receiver is inexpensive, reusable and does not require permanent installation. The receiver includes an elongate webbed conduit having a central passageway formed therein. The conduit includes an opened end, a closed end and fastening apparatus for attaching the opened end to a pipeline section.

The webbed conduit includes longitudinal webbings or strips positioned along the length of the passageway and transverse webbings circumferentially positioned around the passageway and attached to the longitudinal webbings at regular intervals. The webbings are preferably nylon, but may be manufactured of other fabrics or materials of sufficient strength and flexibility. The webbings are preferably attached to one another by nylon stitching at their points of intersection. So constructed, the webbed conduit includes openings or interstices formed by the intersection of the longitudinal webbings and the circumferential webbings. The interstices are sized so as to prevent the pig from extruding through the interstices and out of the passageway. The interstices may be generally rectangular in shape and should be sized such that the length of each side of the rectangle is less than or equal to one-half the diameter of the uncompressed pig.

The apparatus for attaching the webbed conduit to the pipeline includes loops in the ends of longitudinal webbings. These loops are preferably formed by folding the ends of the longitudinal webbings back upon themselves and stitching the ends in place. A chain is disposed through the loops and tightly secured about the pipeline such that the opened end of the passageway is generally aligned with the pipeline.

A closure is provided at the opposite end of the webbed conduit for closing the passageway. The closure is employed to draw together the unattached ends of the longitudinal webbings. The closure may include loops formed in the unattached ends of the longitudinal webbings and a clevis disposed through the loops. A fastener is employed to secure the legs of the clevis together and thereby secure the loops on the clevis.

Receivers of varying length may be employed. The receiver may be approximately nine times the diameter of the pig to be received.

Thus, the present invention comprises a combination of features and advantages which enable it to substantially advance the pig receiving technology by providing a portable, reusable and inexpensive receiver that is easily attached and detached and may be used under a variety of differing conditions. These and various other characteristics and advantages of the present invention will be readily apparent to those skilled in the art upon reading the following detailed description and referring to the accompanying drawings.

BRIEF DESCRIPTION OF THE DRAWINGS

For an introduction to the detailed description of the preferred embodiment of the invention, reference will now be made to the accompanying drawings, wherein:

FIG. 1 shows an isometric view of the pig receiver of the present invention;

FIG. 2 shows an enlarged perspective view of one portion of the pig receiver shown in FIG. 1;

FIG. 3 shows a side sectional view of the pig receiver shown in FIG. 1 attached to the end of a pipeline at the moment that a pig, discharged from the pipeline, contacts the distal end of the receiver;

DETAILED DESCRIPTION OF THE PREFERRED EMBODIMENT

Figure 5:
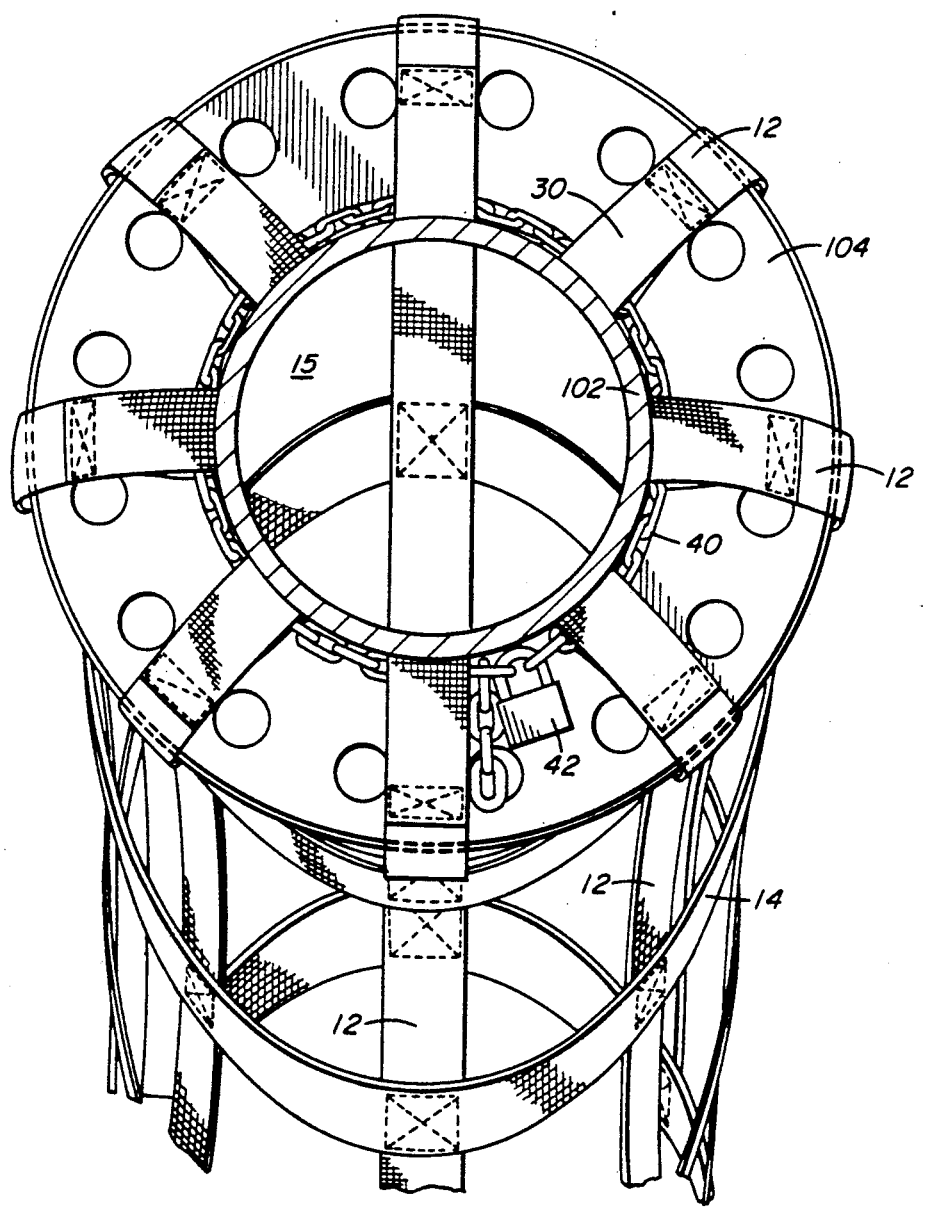
FIG. 5 shows a cross sectional view taken along line 5—5 in FIG. 3 showing the end of the pipeline with the attached receiver shown in the relaxed position before a pig has been discharged from the pipeline.

Referring first to FIGS. 1 and 3, there is shown a sling-like pig receiver 10 of the present invention suitable for receiving or catching a pipeline pig 100 when attached to pipeline section 102. As best shown in FIG. 1, receiver 10 includes a plurality of longitudinal webbings 12 and circumferential webbings 14, attached together to form a lacework conduit of webbing 20 having a central cylindrical passageway 15. Webbed conduit 20 includes proximal end 16 suitable for attachment to flange 104 of pipeline section 102, and a distal end 1B for arresting the motion of pig 100 as it is discharged from pipeline section 102.

As best shown in FIG. 1, longitudinal webbings 12 are positioned parallel to one another and spaced apart in a circular orientation. Circumferential webbings 14 extend transversely to and are disposed around the outer surface of longitudinal webbings 12. It is desirable that the inner surface of passageway 15 be relatively smooth and free from ridges or protrusions which would inhibit the pig 100 from sliding freely within passageway 15 following discharge from pipeline 102. Accordingly, it is preferred that circumferential webbings 14 be disposed around and attached to the outer surface of longitudinal webbings 12.

As shown in FIG. 2, circumferential webbings 14 are attached to the outer surface of longitudinal webbings 12 by stitching 22. Stitching 22 preferably is made of nylon or another equally strong or resilient material which meets the standards for lifting as established by the Occupational Safety and Health Administration (OSHA). The preferred pattern of stitching 22, shown in FIG. 2, includes a pair of seams 24 sewn parallel to the edges of longitudinal webbings 12 and the second pair of seams 26 sewn perpendicular thereto. In addition, a pair of diagonal seams 28 are sewn in webbings 12 and 14 to connect the opposite corners of the rectangle that is formed by the two pairs of perpendicular seams 24 and 26.

The webbings 12 and 14 are preferably made of multiply nylon, but may be constructed of another strong and resilient material such as polyester. Suitable webbings 12, 14 include those sold by Liftex Southwest, Inc. of Houston, Tex., which are employed as a part of its Choker Slings. The width of webbings 12, 14 is dependent on the diameter of pipeline 102 and the diameter of pig 100. In general, receiver 10 is constructed of wider webbing when employed to receive large diameter pigs because of the extra weight of such pigs and the force imparted to receiver 10 by the pigs upon discharge. The wider webbings 12, 14 increase the strength of lacework conduit 20 and prevent rupture of the sling-like receiver 10. It has been determined that for a pig having an uncompressed diameter of between 2" and 10", the webbings 12, 14 should be at least 1" in width. For a pig having an uncompressed diameter of 12" to 24", the webbings 12, 14 should be at least 2" in width. For pigs having larger diameters, the webbings 12, 14 should be 3"–4" in width, or greater.

It is preferable that circumferential webbings 14 be spaced apart and attached to longitudinal webbings 12 at regular intervals. As shown in FIG. 1, this configuration of conduit 20 generally defines a plurality of rectangular openings or interstices 36 formed by each pair of adjacent longitudinal webbings 12 and transverse circumferential webbings 14. In the preferred embodiment, longitudinal webbings 12 and circumferential webbings 14 should be attached such that the length of each side of rectangular interstices 36 does not exceed one-half the diameter of the uncompressed pipeline pig 100. Such a design serves to retain pig 100 within receiver 10 and prevent it from extruding out of webbed conduit 20 through interstices 36. It is also preferred that one circumferential webbing 14 be attached near proximal end 16 of longitudinal webbings 12 such that, when receiver 10 is attached to pipeline 102, the circumferential webbing 14 closest to proximal end 16 is located approximately three inches from pipeline flange 104.

The overall length of receiver 10 is defined by the length of longitudinal webbings 12. In turn, the length of longitudinal webbings 12 is depended upon the number of pipeline pigs to be captured by receiver 10 in a particular cleaning operation. For example, it may be desirable to launch two or more pigs in a single cleaning operation where both pigs 100 would be consecutively captured by receiver 10, without the first pig 100 being removed from receiver 10 after capture. Generally, the length of a cleaning pig 100 is approximately 1½ to 2 times its uncompressed diameter. In most instances, a receiver that is 9 times the uncompressed diameter of the pig should perform satisfactory. Thus, for example, for a 12" diameter pig, receiver 10 should be 9 feet in length. For a 10" diameter pig, receiver 10 should be at least 7.5 feet in length. It has been determined that such a length is sufficient to allow receiver 10 to flex and avoid breakage when pig 100 is discharged into passageway 15.

Referring now to FIGS. 1 and 2, longitudinal webbings 12 includes loops 30 formed at both the proximal end 16 and distal end 18 of webbed conduit 20. As best shown in FIG. 2, loops 30 are formed by folding the end of longitudinal webbing 12 back upon itself and then attaching the end to the outward-facing surface of longitudinal webbing 12 as by stitching 32. For strength, it is preferable that the pattern of stitching 32 forming loops 30 be identical to that described above with respect to stitching 22. Stitching 32 is preferably made of nylon, although other materials having sufficient strength and meeting OSHA lifting standards can be employed.

To safely and effectively arrest pig 100 upon discharge, receiver 10 must be securely attached to pipeline section 102. To attach receiver 100, webbed conduit 20 is generally positioned in coaxial alignment with pipeline section 102, best shown in FIGS. 3 and 5. Proximal end 1 is positioned behind pipe flange 104 and a chain 40 is threaded around pipe section 102 through loops 30 of longitudinal webbings 12. Once thus positioned, chain 40 is tightened around pipeline section 102 and adjacent links of chain 40 are affixed together such as by padlock 42. Chain 40 is preferably a high tensile strength steel chain with ⅛ to ¾ inch diameter links. Padlock 42 may, for example, be a MASTERLOCK (TM) padlock. Alternative means for affixing the adjacent links of the chain 40 include a bolt which is passed through the links and threaded with a nut (not shown).

Figure 4:
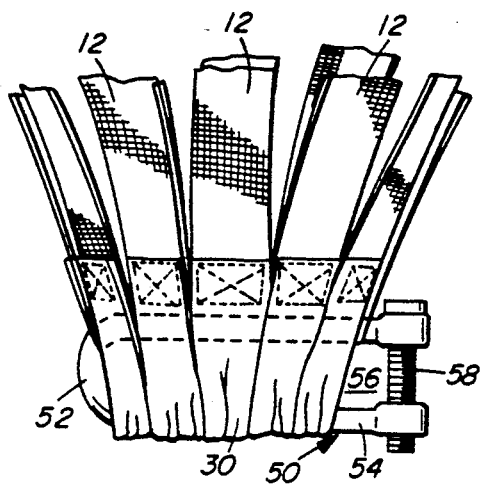
FIG. 4 shows an enlarged view of the distal end of the receiver shown in FIG. 3.

Distal end 18 of receiver 10 must be closed so as to arrest the movement of pig 100 when it is discharged from pipeline 102. Accordingly, as shown in FIGS. 3 and 4, a closure 50 is employed at distal end 18 to draw together longitudinal webbings 12 and thereby close passageway 15. As previously stated, cleaning pig 100 may be discharged with extreme force and at a high velocity. Most of the force imparted on the sling-like receiver 10 by discharged pig 100 will be exerted on the distal end 18 of webbed conduit 20. Accordingly, closing means 50 must be of adequate strength to withstand such forces.

One suitable closing means comprises a clevis 52, best shown in FIG. 4. To close passageway 15, the legs 54 of clevis 52 are passed through the loops 30 formed at the distal end 10 of longitudinal webbings 12. Clevis legs 54 are then secured by bolt 58 which passes through bores formed in the ends of clevis legs 54. Bolt 58 thus serves to secure loops 30 on clevis 52.

The size of clevis 52 is determined primarily by the number of loops 30 to be secured thereon, and by the width of longitudinal webbings 12. As will be understood, the more loops 30 which are to be secured by clevis 52, the larger the clevis must be. Similarly, the greater the width of webbings 12, the larger the clevis 52 must be.

In general, the cross sectional diameter of clevis 52 is dictated by the size of clevis throat 56, throat 56 being defined as the distance between clevis legs 54 as shown in FIG. 4. Clevis 52 must be sufficiently strong to withstand the impact of the discharged pig 100 without breakage or deformation. Generally, if the clevis throat 56 is less than 3" across, clevis 52 may have a cross section diameter of approximately ¼ inch. If the clevis throat 56 is between 3 and 10 inches, the diameter of the clevis cross section should be at least ¾" in diameter or more.

As best shown in FIG. 3, with clevis 52 in position so as to draw closed distal end 18 of webbed conduit 20, the distal ends 18 of webbing 12 are drawn radially inward so that the internal diameter of webbed conduit 20 progressively decreases from proximal end 16 to distal end 18. With receiver 10 attached to pipeline section 102, and with closure 50 installed to draw together distal ends 18 of longitudinal webbings 12, receiver 10 hangs loosely from pipeline section 102 as shown in FIG. 5. Upon discharge of pig 100 into receiver 10, pig 100 travels through passageway 15 toward closure 50. As pig 100 progresses along passageway 15, longitudinal webbings 12 absorbs some of the force imparted by pig 100. Webbings 12 further tend to guide pig 100 toward the closure 50. Ultimately, the forward motion of pig 100 is arrested as pig 100 impacts upon loops 30 and closure 50 at the distal end 18 of receiver 10 and webbed conduit 20 is stretched taut as shown in FIG. 3.

Figure 6:
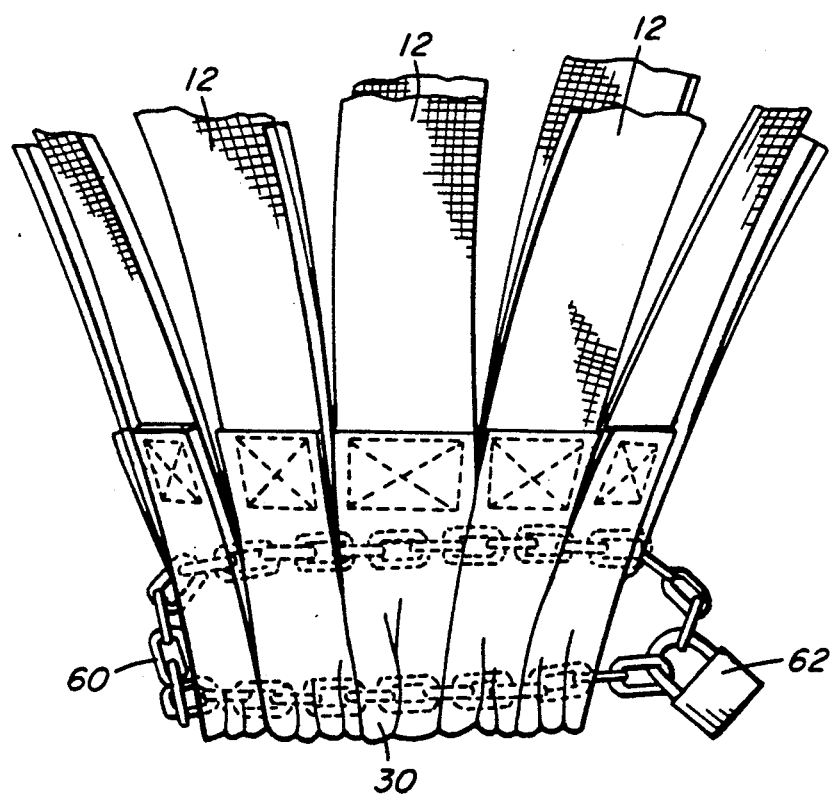
FIG. 6 shows an enlarged view of an alternative means to that shown in FIG. 4 for securing together the distal ends of the receiver.

Referring to FIG. 6, there is shown an alternative closing means 50 comprising a chain 60 disposed through loops 30 of longitudinal webbings 12. Adjacent lengths of chain 760 are fixed together by lock 62.

In summary, there is provided a portable receiver 10 for pipeline pigs that is readily attachable and detachable. The receiver 10 is lightweight and easy to transport. Receiver 10 can be quickly attached and employed at one location and, thereafter, detached and reused elsewhere. Due to its construction from flexible webbing, receiver 10 is easily shipped and stored. Similarly, receiver 10 is relatively inexpensive to manufacture and provides a safe and reliable means for receiving pipeline pigs at locations where permanent receivers are not installed.

While the preferred embodiment of this invention has been shown and described, modifications thereof can be made by one skilled in the art without departing from the spirit of the invention. The embodiments described herein are exemplary only and are not limiting. Many variations and modifications of the apparatus are possible and are within the scope of the invention. Accordingly, the scope of protection is not limited by the above description, but is only limited by the claims which follow, that scope including all equivalence of the subject matter of the claims.

What is claimed is:

1. A receiver for pipeline pigs, comprising:
   an elongate fabric lacework having a passageway formed therein, said passageway having an opened end and a closed end;
   means for attaching said lacework to a pipeline such that said opened end of said passageway is substantially aligned with the pipeline and wherein said lacework comprises:
   a plurality of longitudinal webbings positioned along the length of said passageway; and
   a plurality of circumferential webbings positioned circumferentially around said passageway and attached to said longitudinal webbings by stiching, said longitudinal webbings and said circumferential webbings forming interstices therebetween.

2. The receiver of claim 1 wherein said interstices are smaller than the size of the pipeline pig, such that the pipeline pig cannot pass through said interstices.

3. The receiver of claim 1 wherein the said lacework has generally rectangular shape interstices and wherein the length of each side of said rectangular interstices is not greater that one-half the diameter of the pipeline pig.

4. The receiver of claim 1 wherein said lacework is formed of nylon webbing.

5. The receiver of claim 1 wherein said lacework has a length not less than nine times the diameter of the pipe.

6. The receiver of claim 1 wherein said longitudinal webbings and said circumferential webbings comprise fabric strips having a width of at least one inch.

7. The receiver of claim 1 wherein said attachment means comprises a means for drawing the ends of said longitudinal webbings towards the longitudinal axis of said passageway and for securing the ends to the pipeline.

8. A receiver of claim 7 wherein said drawing and securing means comprises:
 loops formed in the ends of said longitudinal webbings; and
 a chain disposed through said loops and secured about the pipeline by locking means passing through links of said chain.

9. Apparatus for receiving pipeline pigs of a predetermined diameter as the pigs are discharged from a pipe, comprising:
 a latticework conduit having a first open end and a second open end and a passageway with central axis extending between said open ends, said latticework including flexible longitudinal webbings along the length of said passageway wherein said webbings shave a width of at least one inch and a first end adjacent said first open end of said latticework conduit and a second end adjacent said second open end of said latticework conduit;
 means for attaching said first open end of said latticework conduit to a pipe such that said passageway is aligned with the pipe; and
 means for drawing said second ends of said longitudinal webbings radially inward toward said central axis of said passageway.

10. The apparatus of claim 9, wherein said attaching means comprises means for securing said first ends of said longitudinal webbings to the pipe.

11. The apparatus of claim 10 wherein said securing means comprises:
 loops formed in said first ends of said longitudinal webbings; and
 a chain disposed through said loops and around the pipe.

12. The apparatus of claim 9, wherein said drawing means comprises:
 loops formed in said second ends of said longitudinal webbings;
 a clevis disposed through said loops, said clevis including as pair of legs; and
 a fastener adapted to secure said legs of said clevis together, whereby said loops are retained on said clevis.

13. The apparatus of claim 90 wherein said latticework conduit includes interstices sized to present the pig from passing through said interstices.

14. The apparatus of claim 9 wherein the length of said latticework conduit is not less than nine times the diameter of the pig.

15. The apparatus of claim 9 further comprising flexible circumferential webbings attached transversely to said flexible longitudinal webbings by stitching.

16. The apparatus of claim 15 wherein said circumferential webbings and said longitudinal webbings comprise a plurality of fabric strips having a width of at least one inch.

17. The apparatus of claim 15 wherein said circumferential webbings and said longitudinal webbings are attached by stitching.

18. An apparatus for receiving a pipeline pig discharged from an opening in a pipeline, comprising:
 interlaced webbing forming a passageway therein;
 means for attaching said webbing to a pipeline such that said passageway is aligned with the opening in the pipeline, said interlaced webbing comprising a plurality of fabric strips positioned longitudinally along the length of said passageway and a plurality of fabric strips attached transversely to said longitudinal strips.

19. The apparatus of claim 18 wherein said webbing is made of nylon.

20. The apparatus of claim 18 wherein said means of attachment of said fabric strips comprises stitching.

21. An apparatus of receiving a pipeline pig, comprising:
 interlaced webbing forming a passageway therein;
 means for attaching said webbing to a pipeline such that said passageway is aligned with the opening in the pipeline;
 wherein said passageway has a generally circular cross section and wherein said cross section deceases along the length of said passagway; and
 wherein said passageway has a length that is at least nine times the largest diameter of said passageway.

22. A sling for catching compressible pipeline pigs having a first diameter when uncompressed and a second smaller diameter when compressed and propelled through a pipe, said sling comprising:
 a plurality of longitudinal webbings, said longitudinal webbings having a first and second ends;
 a plurality of circumferential webbings attached transversely to said latitudinal webbings;
 means for attaching said first ends of said longitudinal webbings to the pipe;
 a releasable cinch adapted for drawing said second ends of said longitudinal webbings radially inward to a drawn-in position and securing them in said drawn-in position.

23. The pig catching sling of claim 22 wherein said circumferential webbings are stitched to said longitudinal webbings.

24. The pig catching sling of claim 22 wherein the length of said sling is approximately nine times the first diameter of the pipeline pig.

25. The pig catching sling of claim 22 wherein said longitudinal webbings and said circumferential webbings comprise strips of fabric having a width of at least one inch.

26. The pig catching sling of claim 22 wherein said circumferential webbings are spaced at regular intervals along said longitudinal webbings such that a plurality of rectangular interstices are defined therebetween.

27. The pig caching sling of claim 26 wherein the length of each side of said rectangle interstices is not greater than one-half of the first diameter of the pipeline pig.

28. The pig catching sling of claim 22 wherein said second ends of said longitudinal webbings include a means for receiving said cinch.

29. The pig catching sling of claim 28 wherein said cinch receiving means comprises loops formed in said second ends of said longitudinal webbings.

30. The pig catching sling of claim 29 wherein said cinch comprises a chain having two of its links affixed together.

31. The pig catching sling of claim 29 wherein said cinch comprises a clevis.

* * * * *